United States Patent
Piccolo, III (10) Patent No.: US 10,390,160 B2
(45) Date of Patent: Aug. 20, 2019

(54) SYSTEM AND METHOD FOR TESTING EMERGENCY ADDRESS SYSTEMS USING VOICE RECOGNITION

(71) Applicant: Tyco Fire & Security GmbH, Neuhausen am Rheinfall (CH)

(72) Inventor: Joseph Piccolo, III, Fitzwilliam, NH (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/619,780

(22) Filed: Jun. 12, 2017

(65) Prior Publication Data

US 2018/0358018 A1    Dec. 13, 2018

(51) Int. Cl.
*H04R 29/00* (2006.01)
*G10L 15/26* (2006.01)
*G10L 15/32* (2013.01)
*G08B 29/12* (2006.01)
*H04R 27/00* (2006.01)

(52) U.S. Cl.
CPC ......... *H04R 29/007* (2013.01); *G08B 29/126* (2013.01); *G10L 15/26* (2013.01); *G10L 15/265* (2013.01); *G10L 15/32* (2013.01); *H04R 27/00* (2013.01)

(58) Field of Classification Search
CPC ....... G10L 15/26; G10L 15/265; H04R 27/00; H04R 29/007
USPC ............................ 704/235, 273, 274; 381/81
See application file for complete search history.

(56) References Cited

U.S. PATENT DOCUMENTS

| | | | |
|---|---|---|---|
| 9,026,439 B2 | 5/2015 | Reiswig | |
| 2004/0165732 A1* | 8/2004 | Arcaria | H04R 29/007 381/81 |
| 2005/0135637 A1* | 6/2005 | Obranovich | G08B 29/10 381/92 |
| 2010/0128967 A1* | 5/2010 | Steadman | G06F 3/03 382/141 |
| 2014/0266669 A1* | 9/2014 | Fadell | G05B 19/042 340/501 |
| 2015/0235540 A1* | 8/2015 | Verna | G08B 21/02 340/539.11 |
| 2016/0110816 A1* | 4/2016 | Cardin | G06Q 40/08 705/4 |

(Continued)

*Primary Examiner* — Shaun Roberts
(74) *Attorney, Agent, or Firm* — HoustonHogle LLP (57) ABSTRACT

An apparatus and method for verifying voice messages generated by notification devices in an emergency address system includes one or more verification devices and a validation module, which can be part of a control panel or a connected services system. The verification devices can be mobile computing devices or permanently installed devices associated with each notification device in the emergency address system. The verification devices include microphones, network interfaces, and controllers executing speech to text conversion processes. During testing, the notification devices play voice messages and the verification devices detect the messages, convert the messages to text and send the text-converted messages to the validation module, which validates the text-converted messages against the intended messages for each notification device and confirms that the messages were played in the correct locations.

17 Claims, 10 Drawing Sheets

(56) References Cited

U.S. PATENT DOCUMENTS

2017/0034295 A1* 2/2017 Verna ................... H04L 67/26
2017/0061961 A1* 3/2017 Nichols ............... G06Q 10/103

* cited by examiner

FIG. 3A (Manual Test by Inspector with mobile application)

FIG. 3B

FIG. 3C (Manual Test by Inspector using control panel)

FIG. 6 (Control Panel Self-Test)

(Connected Services System Remotely Controlled Self-Test)

SYSTEM AND METHOD FOR TESTING EMERGENCY ADDRESS SYSTEMS USING VOICE RECOGNITION

BACKGROUND OF THE INVENTION

Emergency address systems are often installed within commercial, residential, or governmental buildings. Examples of these buildings include hospitals, warehouses, schools, shopping malls, multi dwelling units, government buildings, and casinos, to list a few examples. The emergency address systems are sometimes integrated with, or part of, larger building management systems such as fire alarm systems, security systems and access control systems, among other examples.

Emergency address systems typically include a control panel and notification devices. The control panel sends instructions to the notification devices to generate voice messages, which are played through speakers of the notification devices. In response to an alarm signal (for example, from a connected fire alarm system), the notification devices will play voice messages that include instructions for evacuating the building. For emergency address systems that include addressable speaker systems, individual voice messages may be sent to different notification devices by the control panel.

Typically, the emergency address systems are periodically tested by inspectors (e.g., monthly, quarterly, or annually depending on fire or building codes) to verify that the devices are physically sound, unaltered, working properly, not obstructed, properly labeled, and located in their assigned locations. In general, the term inspector refers to any person that inspects the alarm initiating device. Thus, the inspector could be a person that only inspects the devices or the inspector could be, for example, a technician that is also able to install, configure, and/or repair emergency address systems.

This testing of the devices is often accomplished with a walkthrough test. Typically, walkthrough tests are performed by a team of at least two inspectors. The first inspector manually sends instructions to notification devices from the control panel, and the second inspector walks through the building verifying that the correct voice messages are played by the correct notification devices. The second inspector verifies the voice messages by listening and confirming that the played voice messages match the intended voice messages and by confirming that no voice messages are played in areas where they are not intended.

More recently, it has been proposed to use connected services systems to monitor building management systems. This has allowed the control panels to report status information to the connected services systems and receive instructions from the connected services systems. These connected services systems will also often have remote diagnostic capabilities. As such, connected services systems enable communications between a control panel of an emergency address system and a mobile computing device operated by an on-site inspector and thus can be used to facilitate the inspection process.

SUMMARY OF THE INVENTION

During a walkthrough test, at least one inspector is required to walk through an entire premises and listen to a voice message played by each notification device. In emergency address systems that are very large, the number of notification devices can number in the hundreds. Additionally, confirming that a voice message is played by the intended notification device but not played by any of the other devices requires multiple passes through the building as different notification devices in different locations are tested. Thus, the current process for inspecting emergency address systems is costly and difficult. It is also disruptive to the occupants.

It would be desirable for an inspection process to allow for automatic inspection of the operation of notification devices (such as confirming that the correct voice messages are played in the correct zones). The current invention provides a means for automatically verifying operation of the emergency address system by using a verification device that listens to the voice messages during testing and converts them to message text that can be compared to the intended voice messages, as well as verifying that the voice messages are not playing in zones that are not intended.

In general, according to one aspect, the invention features an apparatus for verifying messages generated by voice notification devices of an emergency address system. The apparatus comprises one or more local verification devices for detecting the voice messages generated by the different voice notification devices, one or more speech to text modules for processing the detected voice messages into text, and a validation module for validating text-converted voice messages against the voice messages intended for the voice notification devices.

In embodiments, the verification devices are mobile computing devices or permanently installed verification devices corresponding to the different voice notification devices. The verification devices comprise speech to text modules, microphones for detecting voice messages, and wireless and/or wired network interfaces for receiving test mode instructions and for sending text-converted voice messages to the validation module. The apparatus can include a connected services system to receive and store validation information and text-converted voice messages and generate inspection reports. The validation module can be a part of the connected services system or a part of a control panel of the emergency address system. An addressable speaker system can direct different voice messages to be generated by different voice notification devices.

In general, according to another aspect, the invention features a method for verifying messages generated by voice notification devices of an emergency address system. One or more local verification devices detect the voice messages generated by the different voice notification devices, and one or more speech to text modules process the detected voice messages into text. A validation module then validates text-converted voice messages against the voice messages intended for the voice notification devices.

In general, according to another aspect, the invention features a method for verifying messages generated by voice notification devices of an emergency address system. Verification devices in different zones of a premises in which the emergency address system is installed detect the voice messages generated by the voice notification devices located within the same zone as the verification devices. One or more speech to text modules process the detected voice messages into text. A validation module then determines whether the voice messages were detected in intended zones.

In general, according to another aspect, the invention features a verification device that detects and processes voice messages generated by voice notification devices within a premises.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
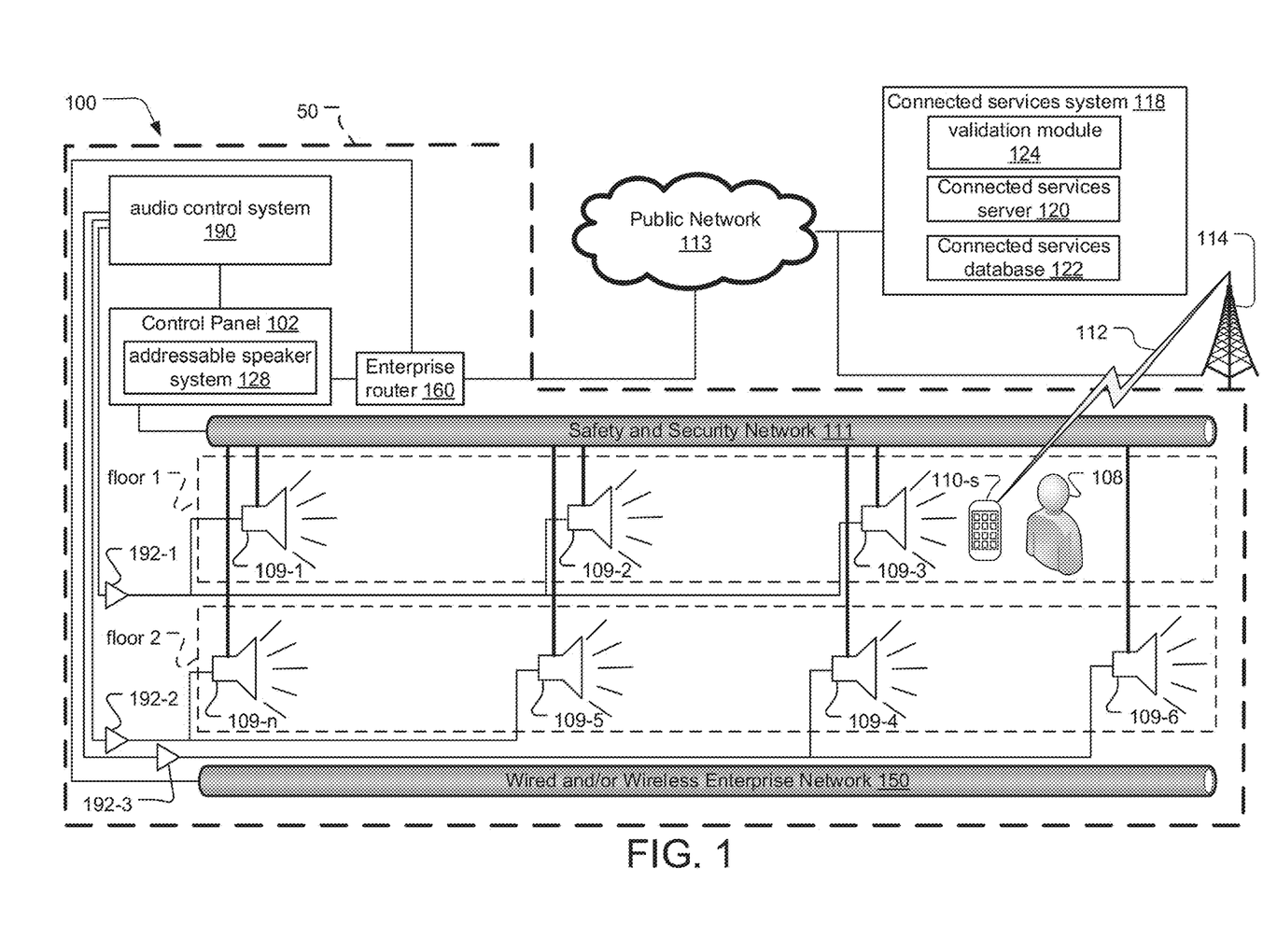
FIG. 1 is a block diagram of an emergency address system, according to an embodiment of the current invention, wherein the verification device is a mobile computing device.

FIG. 1 is a block diagram of an emergency address system 100, according to an embodiment of the current invention.

At a high level, the emergency address system 100 includes notification devices 109, a control panel 102, and a connected services system 118.

Generally, the emergency address system 100 is located within and/or outside a building 50, which could be residential, commercial, or governmental. Examples of the buildings include offices, hospitals, warehouses, retail establishments, shopping malls, schools, multi unit dwellings, government buildings, or casinos, to list a few examples.

The control panel 102 is a device that directs the function of the emergency address system 100 by determining and displaying the operational status of connected notification devices 109 and by receiving signals and sending instructions to notification devices 109, among other examples. In some embodiments, the emergency address system 100 can be integrated with or part of a larger building management system such as a fire alarm system, a security system, and/or an access control system, among other examples.

Generally, in a typical implementation, the control panel 102 commands that a message be played to an audio control system 190. The audio control system looks up a message in memory (or takes a live audio feed for paging) corresponding to the command from the control panel 102. The audio control system 190 generates an audio signal for that message. The audio signal is routed to audio amplifiers 192-1, 192-2, 192-3 that amplify the signal so it has enough power to drive a notification device or speaker 109 to the correct volume level. Typically all speakers in a zone (such as a floor or region of a building) play the same message and so can use the same amplified audio signal. The amplified audio signal is routed to the notification devices or speaker(s) 109. As a result, all the speakers in a zone or on the same amplifier circuit may receive the same audio signal. On the other hand, the notification devices can be turned on/off individually via control from the control panel via the safety and security network 111. As a result, in one embodiment, a message can be played to all notification devices 109, but they can be individually tested, one at a time.

In one example, in response to an indication of a fire (for example, from an integrated fire alarm system), the control panel 102 sends instructions to the audio control system 190, and the notification devices 109 play voice messages instructing occupants of the building 50 to evacuate. The instructions sent from the control panel 102 can be targeted to notification devices 109 within the same zone. For example, the instructions concerning which exits to take will be different for different parts of the building and the instructions will be different for different floors.

In the illustrated example, the building 50 is divided into floors, floor 1 and floor 2. Notification devices 109-1, 109-2 and 109-3 are on floor 1 and connect to the audio control system 190 via the same audio amplifier 192-1. Notification devices 109-4, 109-5, 109-6 and 109-n are on floor 2. Notification devices 109-5 and 109-n connect to the audio control system 190 via the same audio amplifier 192-2. Notification devices 109-4 and 109-6 connect to the audio control system 190 via the same audio amplifier 192-3. Typically, different voice messages would be played by the notification devices 109 on different floors. The voice messages played by notification devices 109 on the same floor may even differ.

All of the notification devices 109 are connected to the control panel 102 via a safety and security wired and/or wireless network 111 of the building 50. This network 111 supports data and/or analog communication between the notification devices 109, the control panel 102. Thus, individual notification devices 109 can be activated or deactivated individually, allowing notification devices 109 in the same zone to be tested individually.

Additionally, in some embodiments, fire alarm devices, such as smoke detectors, manual pull stations and fire suppression devices, and security devices such as surveillance cameras, motion detectors, and access control readers, could also be connected to the safety and security network 111.

In the illustrated embodiment, the control panel 102, in turn, is connected to the connected services system 118 via a leased data connection or public network 113, which is a wide-area network such as the interne.

That said, in other examples, the connected services system and the system contained within the building 50 is not a public network but the private building or even dedicated network (e.g. VLAN), as long as it had a connection to the inspector's device 110-s.

In general, the connected services system 118 facilitates the monitoring, maintenance, testing, configuration and repair of building management systems by gathering and storing information from connected building management systems, including emergency address systems 100.

The connected services system 118 includes a connected services server 120 and a connected services database 122. The connected services server 120 receives information from various connected emergency address systems 100 typically via the public network 113, and stores the information in the connected services database 122. The connected services system 118 gathers data from emergency address systems 100 by receiving information reported and transmitted from the emergency address systems' 100 control panels 102, including instructions and voice messages intended for the notification devices 109.

In the illustrated embodiment, the connected services system also includes a validation module 124, which, in general, validates that correct voice messages are played by the intended notification devices 109 during an inspection.

A verification device 110, specifically, a mobile computing device 110-s, carried by an inspector 108, also sends and receives data to and from the connected services system 118 via the public network 113. In the illustrated example, the mobile computing device 110-s is a smartphone device.

Alternatively, the mobile computing device 110-s could be a laptop computer, tablet computer, or phablet computer (i.e., a mobile device that is typically larger than a smart phone, but smaller than a tablet), to list a few examples. The mobile computing device 110-s connects to the public network 113 via a wireless communication link 112 to a cellular radio tower 114 of a mobile broadband or cellular network or public and/or private wired data networks such as an enterprise network, Wi-Max, or Wi-Fi network, for example. In the illustrated example a wired and/or wireless enterprise network 150 connects to the public network 113 via an enterprise router 160 and could provide an additional or alternative connection between the mobile computing device 110-s and the public network 113.

In general, the inspector 108 can be any person that inspects the emergency address system 100. Some inspectors 108 may also have additional skills sets (e.g., fire fighting, or technical skills). Thus, the inspector 108 could be a person that only inspects the emergency address system 100 or the inspector 108 could be, for example, a technician that is also able to install, configure, and/or repair emergency address systems 100.

During an inspection, the mobile computing device 110-s detects voice messages played by the notification devices 109, converts the voice messages to text, and sends the text-converted voice messages to the connected services server 120 to be validated by the validation module 124 or a validation module installed within the building 50.

Figure 2:
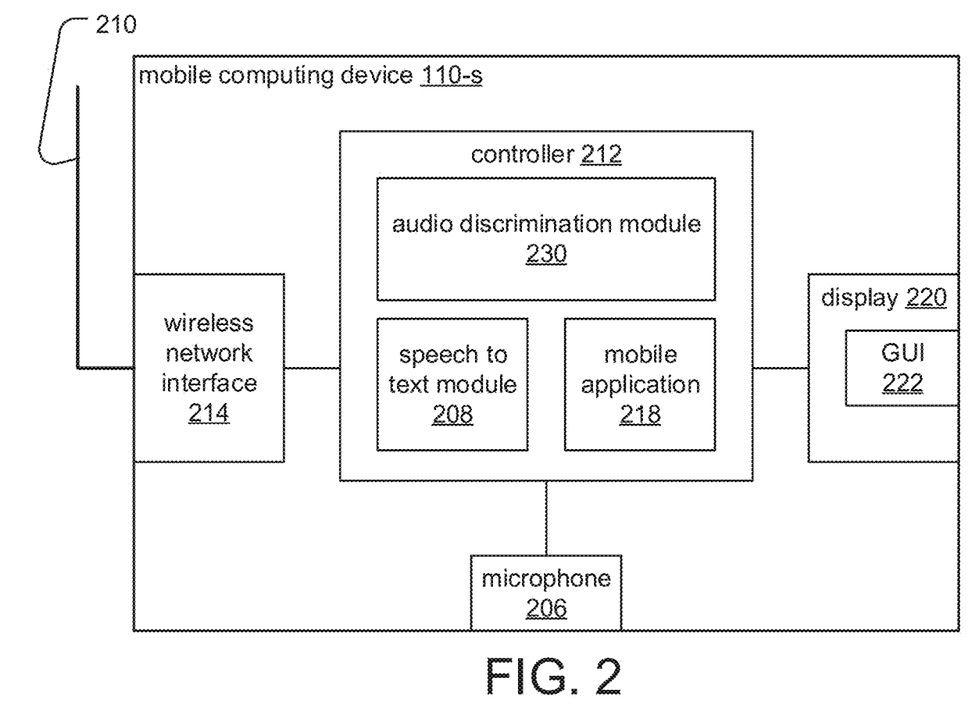
FIG. 2 is a block diagram of the mobile computing device.

FIG. 2 is a block diagram of the mobile computing device 110-s. The device includes a controller 212, a display 220, a microphone 206, a wireless network interface 214, and an antenna 210.

The controller 212 executes firmware/operating system instructions and sends instructions and data to and receives data from the wireless network interface 214, microphone 206, and display 220. Executing on typically an operating system of the controller 212 are a speech to text module 208, a mobile application 218, and an audio discrimination module 230.

The audio discrimination module 230 receives audio information, including voice messages, detected by the microphone 206, and determines whether the audio information is a voice message originating from the notification device 109 being tested (which is presumably the nearest notification device 109). For example, the audio discrimination module 230 monitors for a special tone indicating that an inspection has been initialized for the nearest notification device 109. In this way, the audio discrimination module 230 eliminates the possibility of capturing audio information when an inspection is not in progress and/or the possibility of cross-talk between the mobile computing device 110-s and notification devices 109 that are not currently being tested.

The speech to text module 208 converts the voice messages to text using a local speech recognition application or by sending the audio data to a cloud-based speech recognition system, which returns the converted text.

The mobile application 218 renders a graphical user interface (GUI) 222 on the display 220, which is a touch screen display. The GUI 222 displays information such as identifying information for notification devices 109 to be tested and/or text-converted voice messages, to the user and receives user input such as selections of notification devices 109 to test or indications of results of the inspection, including whether a visual inspection of the notification devices 109 reveals any damage to the devices.

Some of the information displayed by the mobile application 218 is received from the connected services server 120 via the wireless network interface 214 and the antenna 210. The wireless network interface 214 sends and receives information to the public network 113 via a wireless communication link 112 to the cellular radio tower 114 and/or a wireless link to the enterprise network 150. Information, including input received from the inspector 108 via the GUI 222 and text-converted voice messages, is also sent to the connected services server 120 via the wireless network interface 214.

Figure 3A:
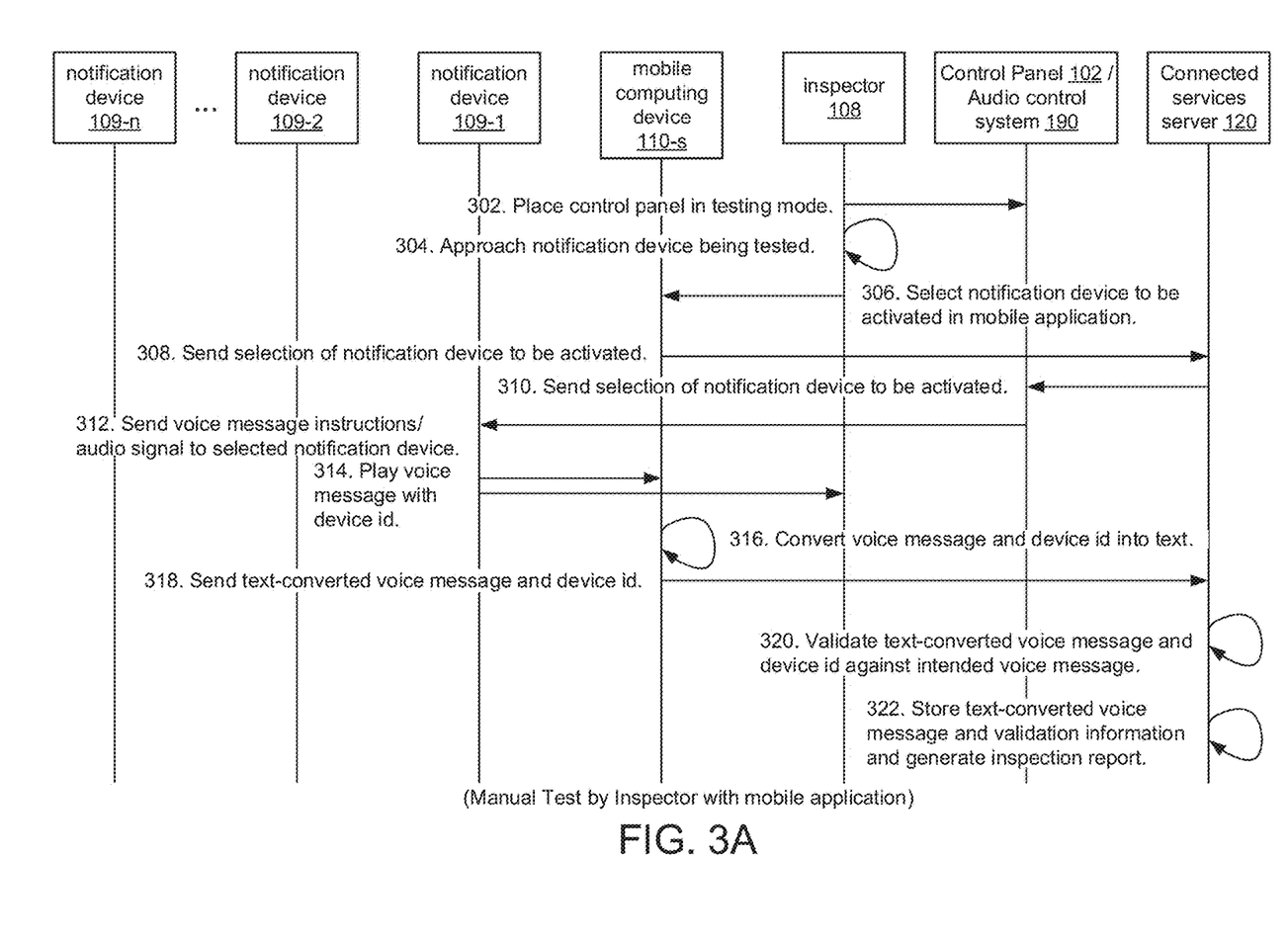
FIG. 3A is a sequence diagram of an example of a walkthrough inspection according to an embodiment of the current invention, in which a mobile application is used to select notification devices to be tested.

FIG. 3A is a sequence diagram of an example of a walkthrough inspection according to an embodiment of the current invention, in which the mobile application 222 is used to select the notification devices 109 to be tested.

In step 302, the inspector 108 places the control panel 102 in a testing mode. Then, in step 304, the inspector 108 approaches the notification device 109 being tested and in step 306 selects the notification device 109 to be tested via the GUI 222 displayed on the mobile computing device 110-s by the mobile application 218. In step 308, the mobile computing device 110-s sends the selection to the connected services server 120, which then sends the selection of the notification device to the control panel 102, or the selection is sent directly to the panel 102.

In step 312, the control panel 102, via voice message instructions sent to the audio control system 190, then sends an audio signal to the selected notification device 109 (in this example, notification device 109-1), which is amplified by the audio amplifier 192. The control panel also activates the notification device 109-1.

In response, in step 314, the selected notification device 109-1 plays the voice message specified by the control panel 102 in the voice message instructions. The voice message incorporates a unique device identification associated with the intended notification device 109. The voice message is detected by both the mobile computing device 110-s and by the inspector 108, who, in different embodiments, can either determine and provide the inspection results via the mobile application 218 or verify results automatically determined by other components of the emergency address system 100.

In step 316, the mobile computing device 110-s converts the detected voice message, including the device identification, into text. In step 318, the text-converted voice message and device identification are sent to the connected services server 120.

In step 320, the connected services server 120, via the validation module 124, validates the text-converted voice message against the intended voice message, for example, using the device identification incorporated into the text-converted voice message. In step 322, the text-converted voice message and validation information, including results of the validation process, are stored in the connected services database 122, and an inspection report is generated.

Figure 3B:
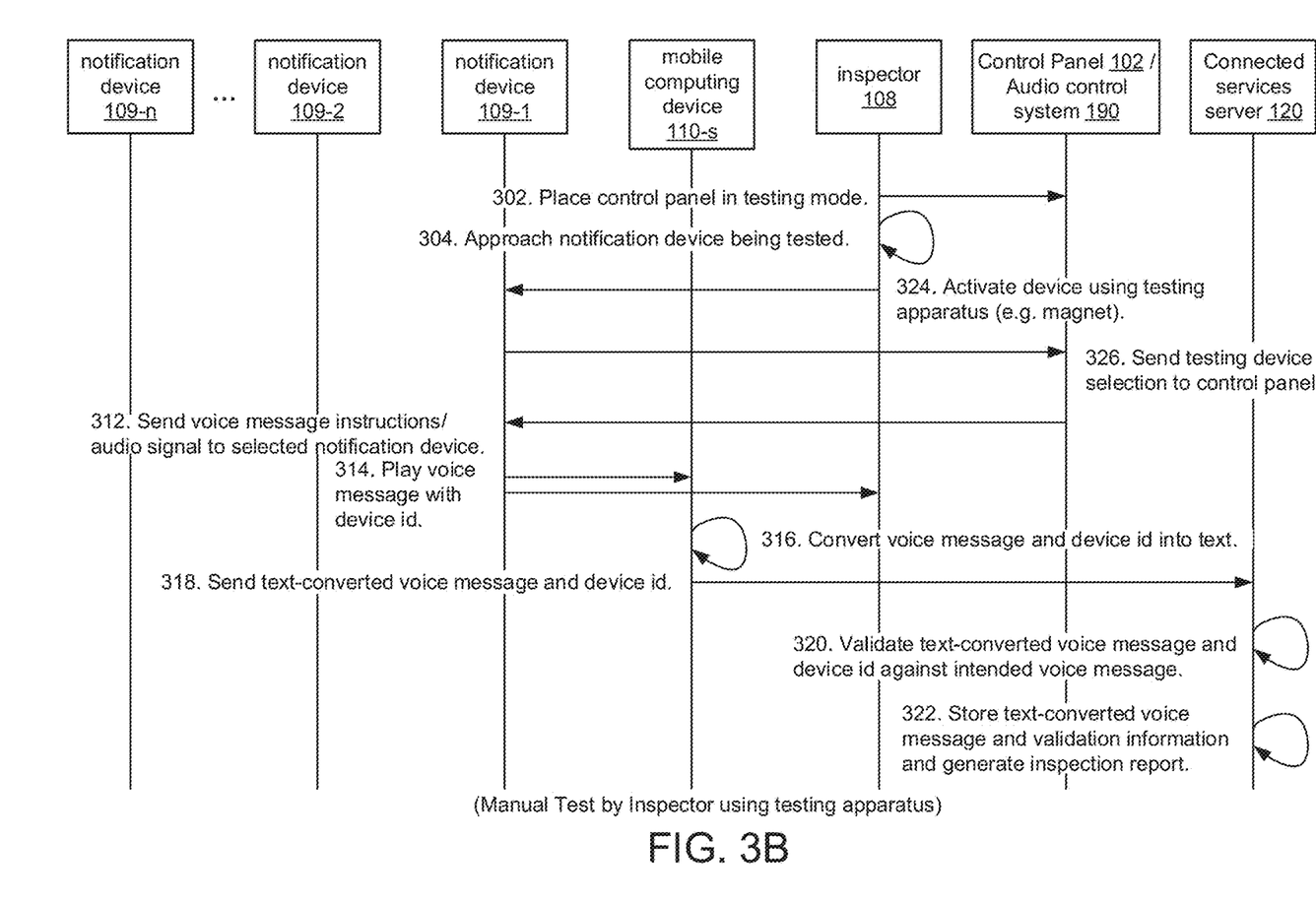
FIG. 3B is a sequence diagram of an example of a walkthrough inspection according to a different embodiment of the current invention, in which a testing apparatus is used to select and activate the notification devices to be tested.

FIG. 3B is a sequence diagram of an example of a walkthrough inspection according to a different embodiment of the current invention, in which a testing apparatus is used to select and activate the notification devices 109 to be tested.

The inspection proceeds similarly to the inspection illustrated in FIG. 3A. Now, however, instead of selecting the notification device 109 via the mobile application 222, the inspector 108 activates the notification device 109 using a testing apparatus in step 324. Examples of a testing apparatus include a magnet or a button on the notification device 109, among other examples.

In step 326, in response to being activated by the inspector 108 using the testing apparatus, the notification device being tested (in this case notification device 109-1), sends a test mode signal indicating the selection of the device to be tested to the control panel 102.

In steps 312 through 322, the inspection process then proceeds as previously described.

Figure 3C:
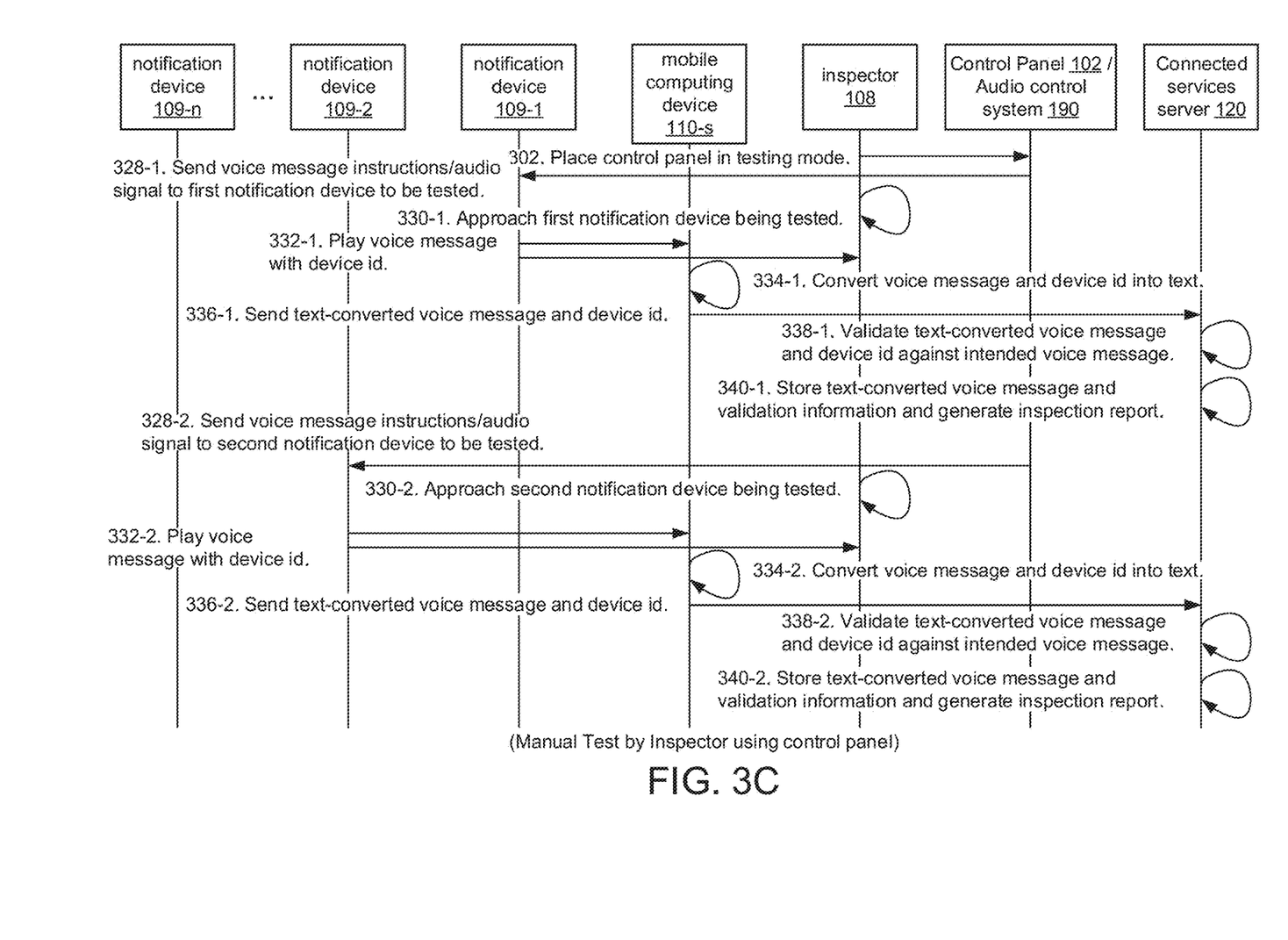
FIG. 3C is a sequence diagram of an example of a walkthrough inspection according to a different embodiment of the current invention, in which the control panel automatically iterates through testing each notification device in response to being placed in testing mode.

FIG. 3C is a sequence diagram of an example of a walkthrough inspection according to a different embodiment of the current invention, in which the control panel 102 automatically iterates through testing each notification device 109 in response to being placed in testing mode.

In step 302, as before, the inspector 108 places the control panel in testing mode.

In step 328-1, the control panel 102, via voice message instructions sent to the audio control system 190, sends an audio signal to the first notification device 109 to be tested (in this example, notification device 109-1), which is amplified by the audio amplifier 192. The control panel further individually activates that notification device 109-1. The inspector 108 then approaches the first notification device 109-1 in step 330-1. In step 332-1, the first notification device 109-1 plays the voice message including a device identification for the intended device. In step 334-1, the mobile computing device 110-s converts the voice message and device identification into text, and in step 336-1, the text-converted voice message and device identification are sent to the connected services server 120. The connected services server 120 then validates the text-converted voice message in step 338-1 and stores the text-converted voice message and validation information, and generates an inspection report, in step 340-1.

This process then automatically repeats in steps 328-2 through 340-2 for the second notification device 109-2.

The automated inspection process, administered by the control panel 102, continues to repeat until all notification devices 109 have been tested.

Figure 4:
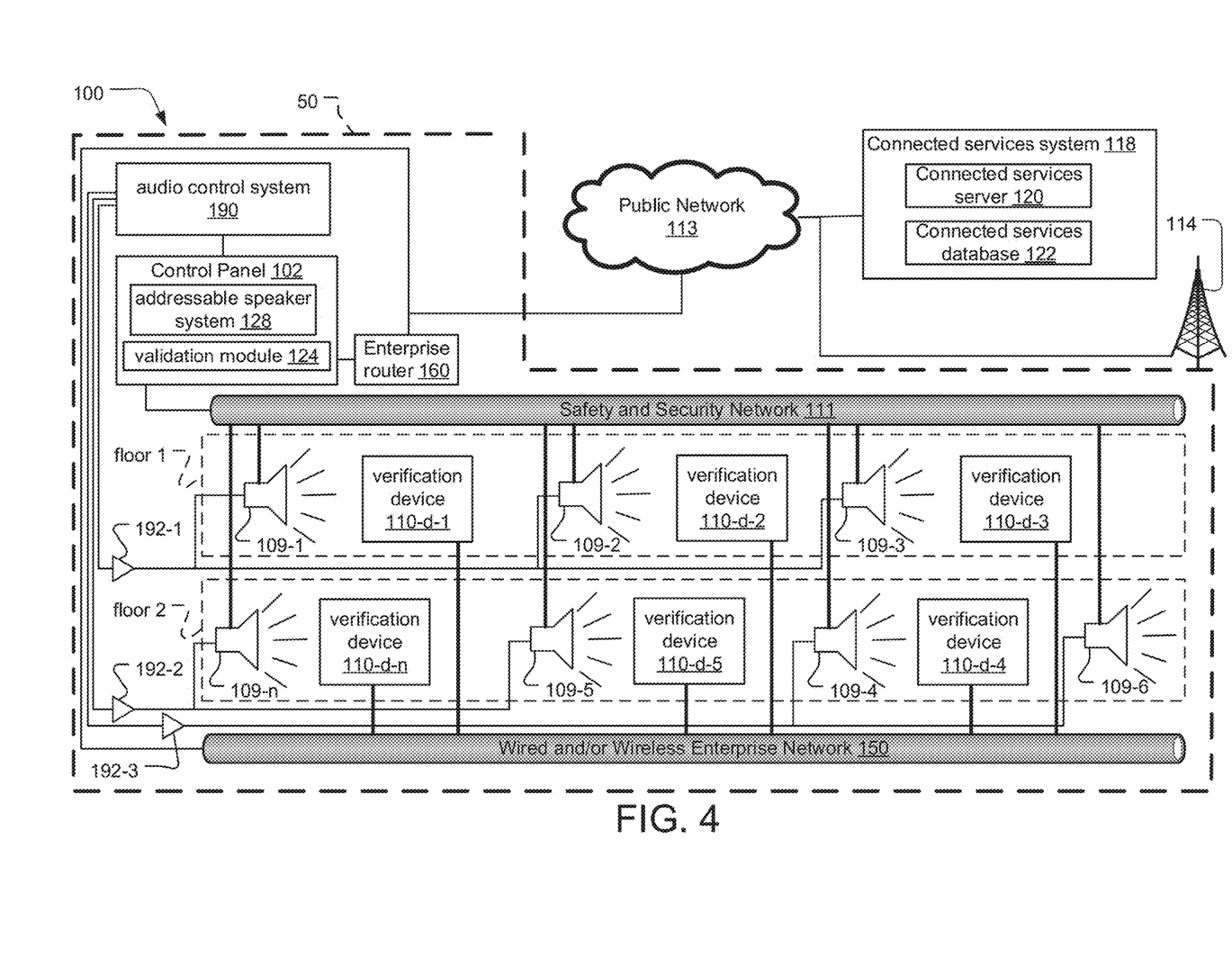
FIG. 4 is a block diagram of the emergency address system, according to a different embodiment of the current invention, wherein verification devices associated with each notification device are permanently installed.

FIG. 4 is a block diagram of an emergency address system 100, according to a different embodiment of the current invention. The emergency address system 100 is similar to the system illustrated in FIG. 1. Now, however, verification devices 110-d associated with each notification device 109 are permanently installed throughout the building 50.

In the illustrated example, verification device 110-d-1 is associated with notification device 109-1, verification device 110-d-2 is associated with notification device 109-2, and verification device 110-d-3 is associated with notification device 109-3 on floor 1. On floor 2, verification device 110-d-4 is associated with notification device 109-4, verification device 110-d-5 is associated with notification device 109-5, and verification device 110-d-n is associated with notification device 109-n.

The verification devices 110-d perform the same function as the mobile computing device 110-s of detecting voice messages played by the associated notification devices 109, converting the voice messages to text and sending the text-converted voice messages to be validated by the validation module 124.

In the illustrated embodiment, the validation module 124 is included as a part of the control panel 102. The verification devices 110-d send the text-converted voice messages to the control panel 102 via the wired and/or wireless enterprise network 150. The control panel 102 connects to the enterprise network 150 via the enterprise router 160.

Figure 5A:
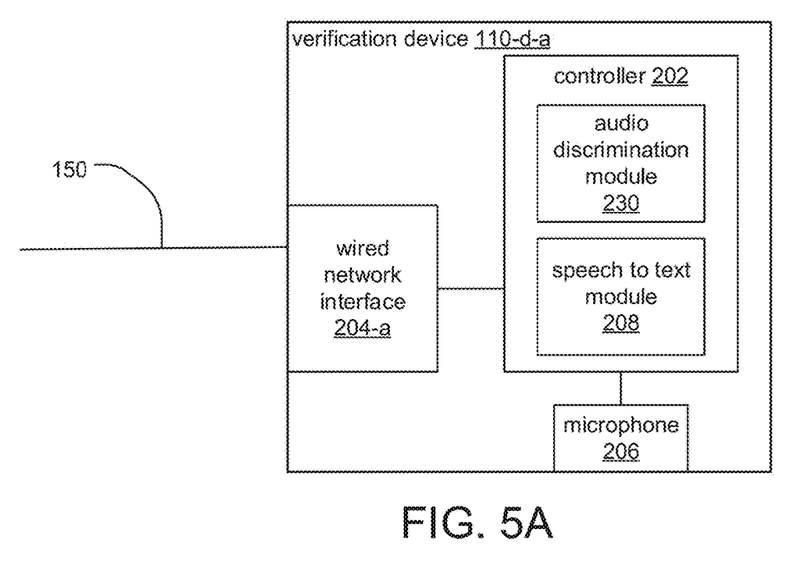
FIG. 5A is a block diagram of one embodiment of the verification device, wherein the verification device communicates with the enterprise network via a wired connection.

FIG. 5A is a block diagram of one embodiment of the verification device 110-d, wherein the verification device 110-d communicates with the enterprise network 150 via a wired connection. Like the mobile computing device, the verification device 110-*d* includes the controller 212, and the microphone 206, and the audio discrimination module 230 and speech to text module 208 execute on the controller 202. Now, however, the verification device 110-*d* sends text-converted voice messages to the connected services server 120 and/or the control panel 102 via a wired link between the wired network interface 204-*a* and the enterprise network 150.

Figure 5B:
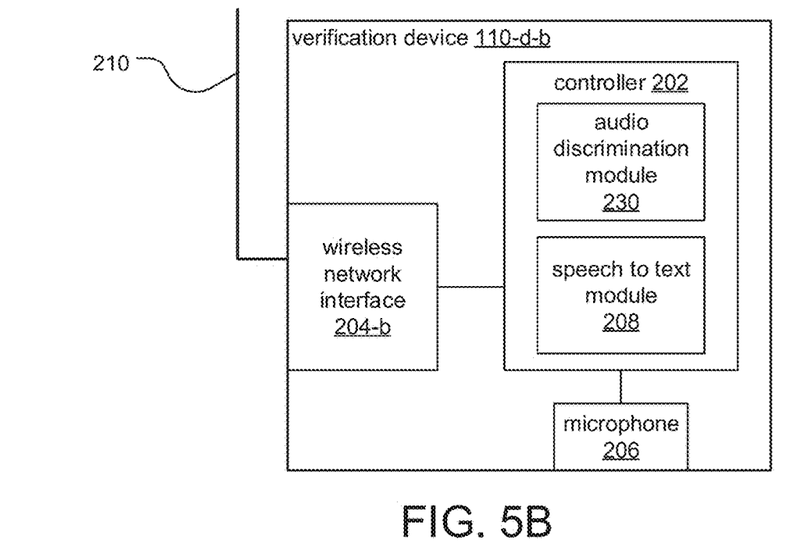
FIG. 5B is a block diagram of another embodiment of the verification device, wherein the verification device communicates with the enterprise network via a wireless connection.

FIG. 5B is a block diagram of another embodiment of the verification device 110-*d*, wherein the verification device 110-*d* communicates with the enterprise network 150 via a wireless connection. Here, the verification device 110-*d* sends text-converted voice messages to the connected services server 120 and/or the control panel 102 via a wireless link between a wireless network interface 204-*b* and antenna 210 and the enterprise network 150.

Figure 6:
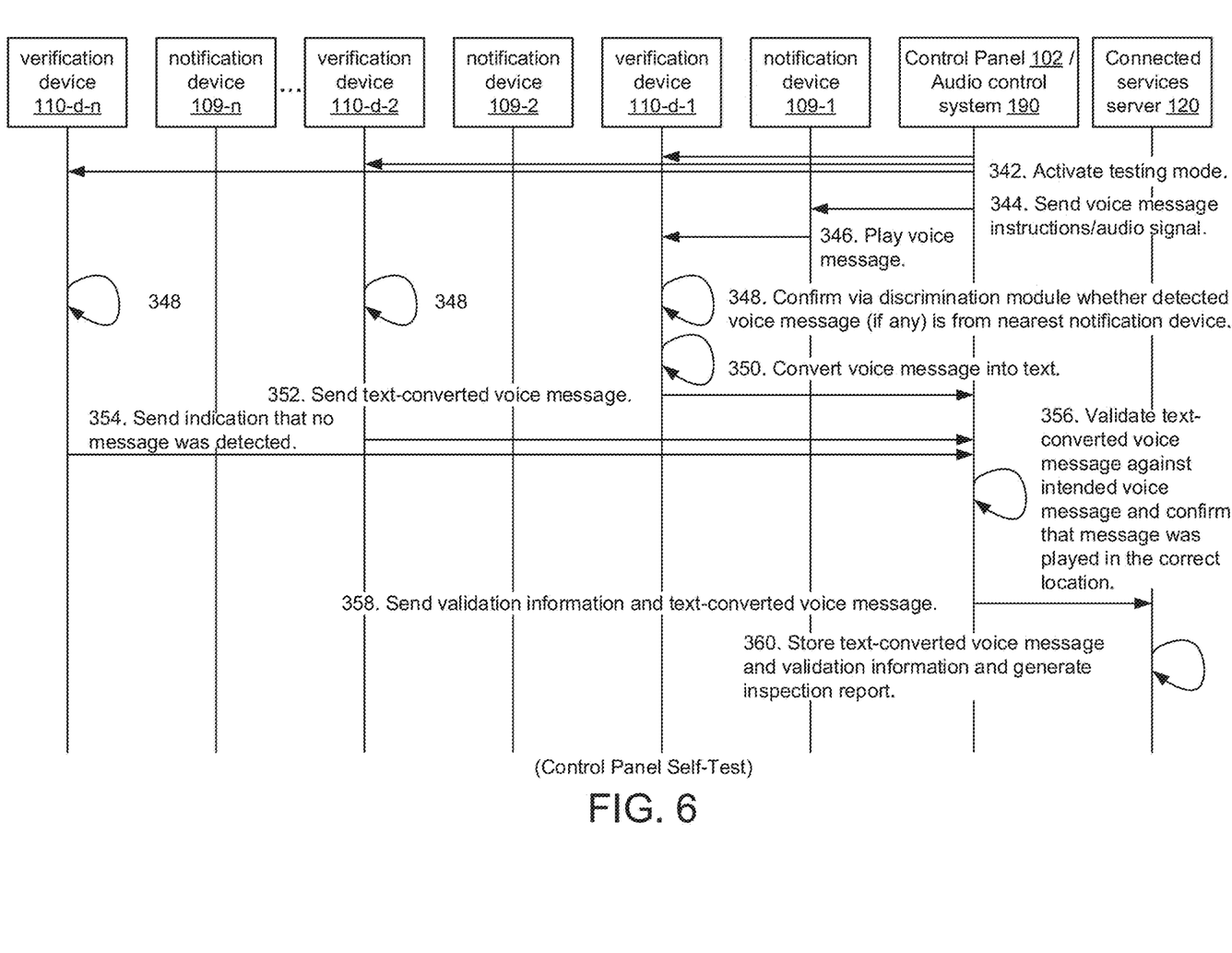
FIG. 6 is a sequence diagram of an example of a walkthrough inspection according to an embodiment of the current invention, in which the control panel administers a self-test of the emergency address system using a series of verification devices, and the validation module is part of the control panel.

FIG. 6 is a sequence diagram of an example of a walk-through inspection according to an embodiment of the current invention, in which the control panel 102 administers a self-test of the emergency address system 100 using a series of verification devices 110-*d*. In this embodiment, the validation module 124 is a part of the control panel 102 as previously discussed.

In step 342, the control panel 102 sends instructions to each of the verification devices 110-*d* to activate testing mode and begin detecting potential voice messages.

Next, in step 344, the control panel 102, via voice message instructions sent to the audio control system 190, then sends an audio signal to the first notification device 109 to be tested (in this example, notification device 109-1), which is amplified by the audio amplifier 192. The control panel further individually activates that notification device 109-1. In response, in step 346, the notification device 109-1 plays the voice message.

In step 348, all of the verification devices 110-*d*, which are continuously monitoring for potential voice messages, confirm via the audio discrimination module 230 whether any detected voice message (if there is one) is from the notification device 109 closest to that verification device 110-*d*. This can be determined in a number of ways, including determining if the intensity of the detected voice message is higher than a predetermined threshold, or monitoring for a special tone that is played by the verification device 110-*d* to indicate that it is being tested, among other examples. This prevents verification devices 110-*d*-2 through 110-*d*-*n* from processing the voice message played by notification device 109-1. If multiple notification devices 109 are playing, determining that only one is working might also require testing each notification device 109 in isolation (by activating the notification device 109 being tested and deactivating the others via an addressable speaker system 128) or by first validating that the voice message from one or more notification devices 109 is correct and then using a separate validation to verify each notification device 109 is working (e.g. via a sound level sensor in the notification device).

In step 350, the verification device 110-*d*-1 converts the detected voice message into text and sends the text-converted voice message to the control panel 102 in step 352. The verification devices 110-*d*-2 through 110-*d*-*n* send a signal indicating that no voice message was detected to the control panel 102 in step 354.

In step 356, the control panel 102, via the validation module 124, validates the text-converted voice message against the voice message intended for the notification device 109-1. The control panel 102 also confirms that the voices message was played in the correct location by verifying that the verification device 110-*d*-1 associated with the intended notification device 109-1 returned a text-converted voice message and that the other verification devices 110-*d*-2 through 110-*d*-*n* did not.

In step 358, the validation information and text-converted voice message are sent to the connected services server 120, where they are stored in the connected services database 122 and where an inspection report is generated.

This process then repeats for each of notification devices 109-2 through 109-*n*.

Figure 7:
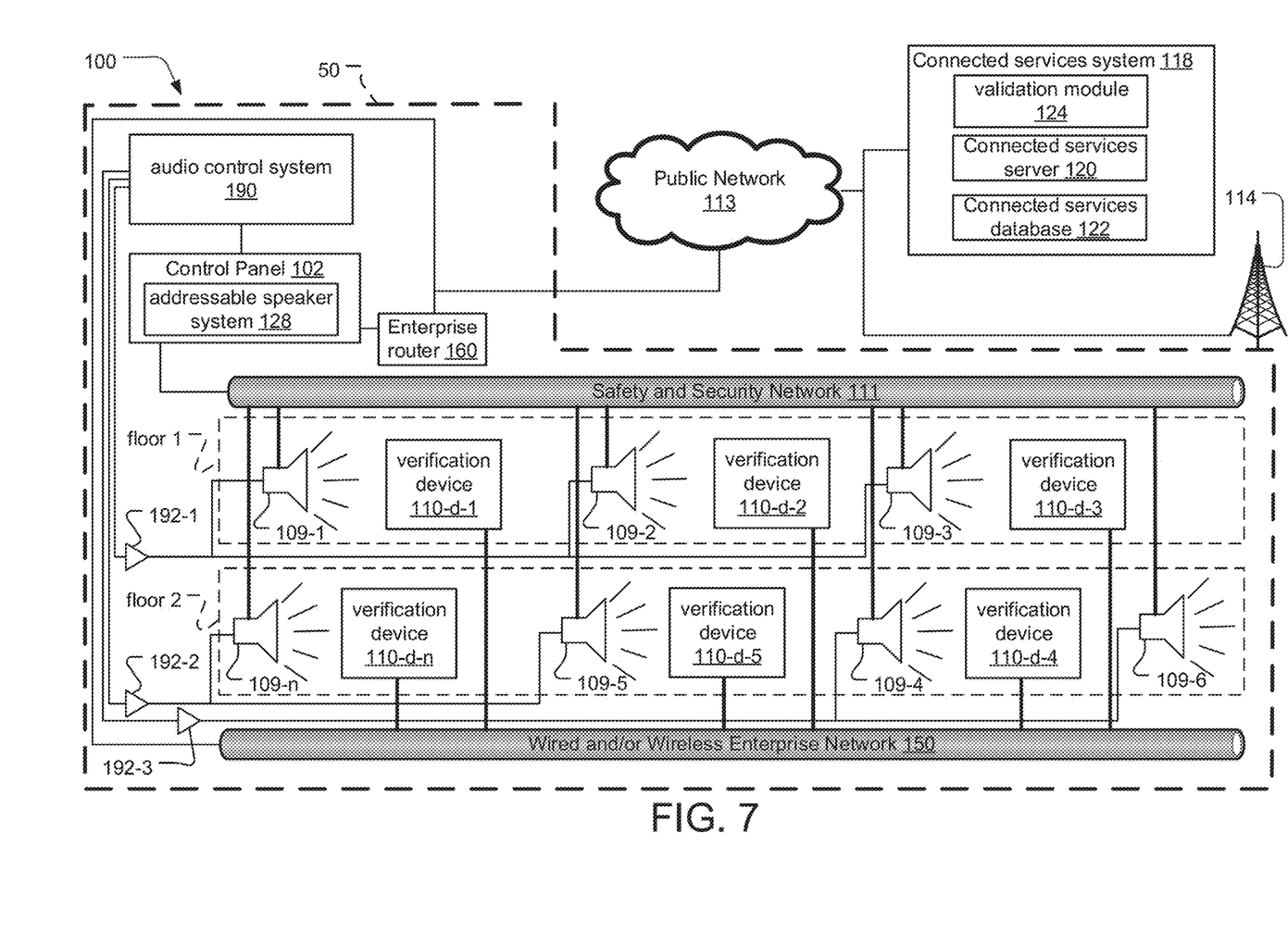
FIG. 7 is a block diagram of an emergency address system, according to a different embodiment of the current invention, wherein the validation module resides in the connected services system.

FIG. 7 is a block diagram of an emergency address system 100, according to a different embodiment of the current invention. The emergency address system 100 is nearly identical to the system illustrated in FIG. 4. Now, however, the validation module 124 resides in the connected services system 118.

Figure 8:
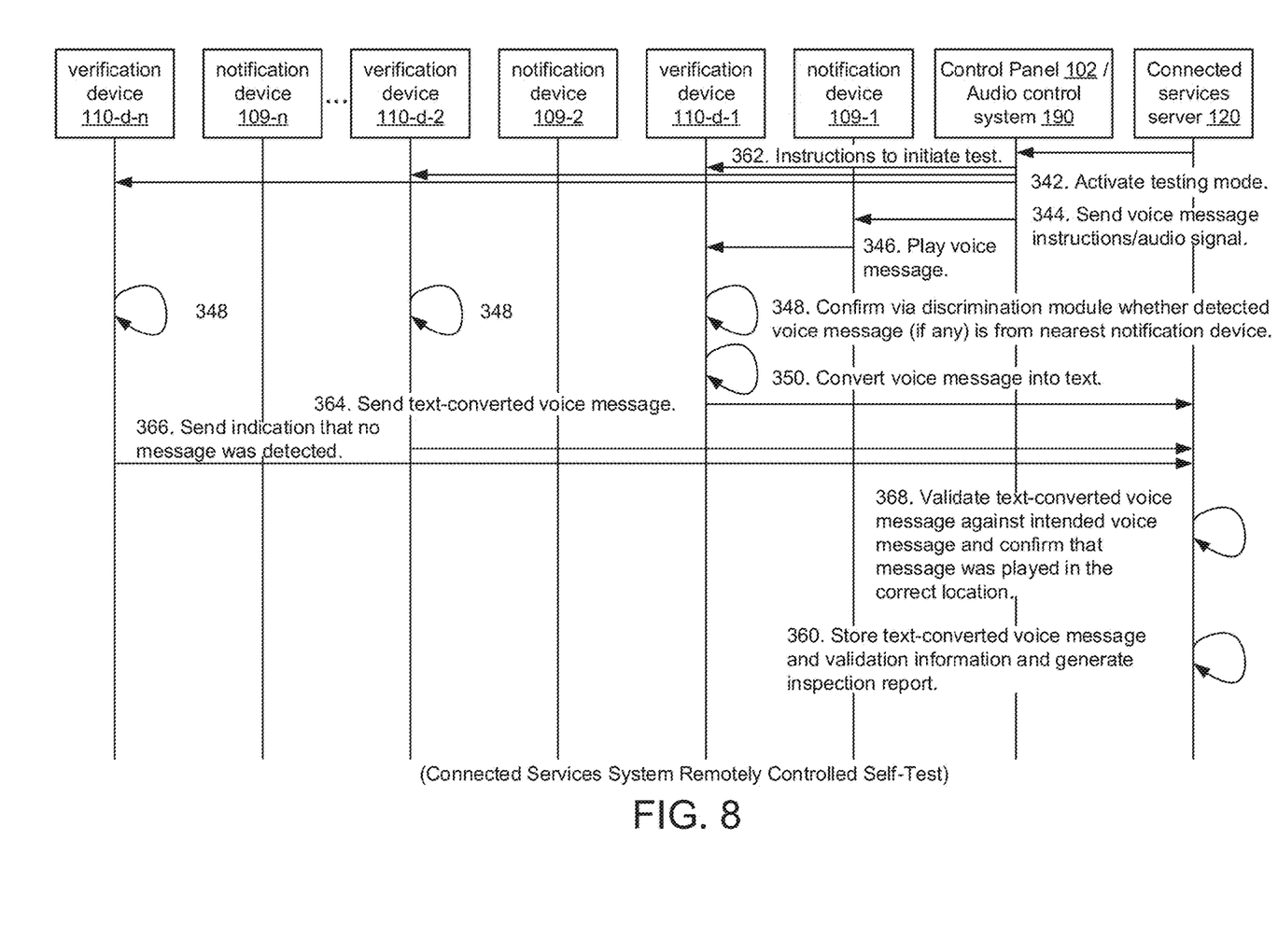
FIG. 8 is a sequence diagram of an example of a walkthrough inspection according to an embodiment of the current invention, in which the connected services system administers a self-test of the emergency address system using a series of verification devices, and the validation module is a part of the connected services system.

FIG. 8 is a sequence diagram of an example of a walk-through inspection according to a different embodiment of the current invention, in which the connected services system 118 administers a self-test of the emergency address system 100 using a series of verification devices 110-*d*. In this embodiment, the validation module 124 is a part of the connected services system 118 as previously discussed, and the verification devices 110-*d* communicate directly with the connected services server 120.

The process proceeds similarly to that described in FIG. 6. Now, however, the connected services server 120 initiates the test by sending instructions to the control panel 102 in step 362. Steps 342 through 350 proceed as previously described.

Then, in step 364, the verification device 110-*d*-1 associated with the notification device 109-1 being tested sends the text-converted message to the connected services server 120. In step 366, the verification devices 110-*d*-2 through 110-*d*-*n* send an indication that no message was detected to the connected services server 120.

In step 368, the connected services server 120 validates the text-converted voice message against the intended voice message and confirms that the message was played in the correct location. In step 360, the text-converted voice message and validation information is stored, and an inspection report is generated as previously described.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for verifying messages generated by voice notification devices of an emergency address system, the apparatus comprising:
   local verification devices for detecting the voice messages generated by the
      different voice notification devices of an addressable speaker system for directing different voice messages to be generated by the different voice notification devices;
   one or more modules for processing the detected voice messages into text;
   the local verification devices being permanently installed and corresponding to the different voice notification devices; and
   a validation module for validating text-converted voice messages against the voice messages intended for the different voice notification devices, the validation module confirming that the voice messages were played in the correct location by verifying that the local verification devices associated with the intended notification device returned the correct text-converted voice message and that the other verification devices did not return voice messages that would be incorrect for their corresponding notification devices.

2. The apparatus as claimed in claim 1, further comprising verification devices that are mobile computing devices.

3. The apparatus as claimed in claim 1, wherein the verification devices comprise speech to text modules.

4. The apparatus as claimed in claim 1, wherein the verification devices comprise microphones for detecting voice messages.

5. The apparatus as claimed in claim 1, wherein the verification devices comprise wireless and/or wired network interfaces for receiving test mode instructions and for sending text-converted voice messages to the validation module.

6. The apparatus as claimed in claim 1, further comprising a connected services system for receiving and storing validation information and text-converted voice messages and for generating inspection reports.

7. The apparatus as claimed in claim 6, wherein the connected services system further comprises the validation module.

8. The apparatus as claimed in claim 1, wherein a control panel of the emergency address system comprises the validation module.

9. A method for verifying messages generated by voice notification devices of an emergency address system, the method comprising:
   local verification devices detecting the voice messages generated by the different voice notification devices of an addressable speaker system for directing different voice messages to be generated by the different voice notification devices, wherein the local verification devices are permanently installed and associated with different voice notification devices;
   one or more modules processing the detected voice messages into text;
   a validation module validating text-converted voice messages against the voice messages intended for the different voice notification devices; and
   the validation module confirming that the voice messages were played in the correct location by verifying that the verification devices associated with the intended notification device returned the correct text-converted voice message and that the other verification devices did not return voice messages that would be incorrect for their corresponding notification devices.

10. The method as claimed in claim 9, further comprising mobile computing devices detecting the voice messages generated by the different voice notification devices.

11. The method as claimed in claim 9, further comprising the verification devices processing the detected voice messages into text.

12. The method as claimed in claim 9, further comprising the verification devices detecting voice messages via microphones.

13. The method as claimed in claim 9, further comprising the verification devices receiving test mode instructions and sending text-converted voice messages to the validation module via wireless and/or wired network interfaces of the verification devices.

14. The method as claimed in claim 9, further comprising a connected services system receiving and storing validation information and text-converted voice messages and generating inspection reports.

15. The method as claimed in claim 14, further comprising the connected services system validating text-converted voice messages against the voice messages intended for the voice notification devices.

16. The method as claimed in claim 9, further comprising a control panel of the emergency address system validating text-converted voice messages against the voice messages intended for the voice notification devices.

17. A method for verifying messages generated by voice notification devices of an emergency address system, the method comprising:
   verification devices in different zones of a premises in which the emergency address system is installed detecting the voice messages generated by the voice notification devices located within the same zone as the verification devices;
   one or more modules processing the detected voice messages into text;
   sending the voice messages over a public network to a connected services system; and
   a validation module, in a connected services system, determining whether voice messages were detected in intended zones, the validation module confirming that the voice messages were played in the correct location by verifying that the verification devices associated with the intended notification device returned the correct text-converted voice message and that the other verification devices did not return voice messages that would be incorrect for their corresponding notification devices; and
   the connected services system storing validation information and text-converted voice messages and generating reports.

* * * * *